(12) United States Patent
Artusio et al.

(10) Patent No.: US 12,147,842 B2
(45) Date of Patent: Nov. 19, 2024

(54) SYSTEM FOR PROVIDING A SERVICE

(71) Applicant: TELECOM ITALIA S.p.A., Milan (IT)

(72) Inventors: Luigi Artusio, Turin (IT); Antonio Manzalini, Turin (IT)

(73) Assignee: TELECOM ITALIA S.p.A., Milan (IT)

( * ) Notice: Subject to any disclaimer, the term of this patent is extended or adjusted under 35 U.S.C. 154(b) by 153 days.

(21) Appl. No.: 17/417,855

(22) PCT Filed: Dec. 23, 2019

(86) PCT No.: PCT/EP2019/086958
§ 371 (c)(1),
(2) Date: Jun. 24, 2021

(87) PCT Pub. No.: WO2020/136177
PCT Pub. Date: Jul. 2, 2020

(65) Prior Publication Data
US 2022/0075663 A1 Mar. 10, 2022

(30) Foreign Application Priority Data
Dec. 28, 2018 (IT) .................. 102018000021343

(51) Int. Cl.
*G06F 9/50* (2006.01)
*G06F 9/455* (2018.01)

(52) U.S. Cl.
CPC ............ *G06F 9/5072* (2013.01); *G06F 9/455* (2013.01); *G06F 9/45533* (2013.01);
(Continued)

(58) Field of Classification Search
CPC .. G06F 9/455; G06F 9/45533; G06F 9/45558; G06F 9/50; G06F 9/5005;
(Continued)

(56) References Cited

U.S. PATENT DOCUMENTS 9,491,035 B1 11/2016 Pauley et al.
10,911,371 B1 * 2/2021 Jacques De Kadt ......................
G06F 9/45533
(Continued)

FOREIGN PATENT DOCUMENTS

| JP | 2003-188877 A | 7/2003 |
|---|---|---|
| JP | 2015-528140 A | 9/2015 |
| WO | WO 2017/005329 A1 | 1/2017 |

OTHER PUBLICATIONS

Ding et al., "QoS-aware resource matching and recommendation for cloud computing systems", Applied Mathematics and Computation 247 (2014) 941-950, 0096-3003 2014 Elsevier Inc. pp. 941-950 (Year: 2014).*

(Continued)

*Primary Examiner* — Charles M Swift
(74) *Attorney, Agent, or Firm* — Oblon, McClelland, Maier & Neustadt, L.L.P.

(57) ABSTRACT

It is disclosed a method and system for providing a service to a user. The system comprises a module (VAHI) associated with the user and configured to act on her/his behalf and a plurality of modules (VAE) associated with and representing respective physical resources. The system comprises a runtime distributed execution environment for running VAHI and VAEs, such environment being provided with a distributed operating system supporting access by VAHI and VAEs to the physical resources. The VAHI is capable of having an interaction with the VAEs and, as a result of such interaction, providing the user with a proposal for the provision of a service. Upon reception of an approval from the user, the VAHI is capable of instructing at least one of the VAEs to request the associated physical resource to perform an action providing at least part of the service according to the proposal.

10 Claims, 4 Drawing Sheets

(52) U.S. Cl.
CPC ............ *G06F 9/45558* (2013.01); *G06F 9/50* (2013.01); *G06F 9/5005* (2013.01); *G06F 9/5027* (2013.01); *G06F 9/5055* (2013.01); *G06F 9/5061* (2013.01); *G06F 9/5077* (2013.01)

(58) Field of Classification Search
CPC .... G06F 9/5027; G06F 9/5055; G06F 9/5061; G06F 9/5072; G06F 9/5077
See application file for complete search history.

(56) References Cited

U.S. PATENT DOCUMENTS

| | | | |
|---|---|---|---|
| 11,030,011 B2* | 6/2021 | Netto | G06F 9/5038 |
| 2015/0263890 A1 | 9/2015 | Fall et al. | |
| 2015/0263982 A1 | 9/2015 | Fall et al. | |
| 2015/0304231 A1* | 10/2015 | Gupte | H04L 47/70 709/226 |
| 2016/0043967 A1 | 2/2016 | Jacob et al. | |
| 2016/0043970 A1 | 2/2016 | Jacob et al. | |
| 2016/0315827 A1 | 10/2016 | Fall et al. | |
| 2016/0315828 A1 | 10/2016 | Fall et al. | |
| 2016/0359764 A1 | 12/2016 | Fall et al. | |
| 2018/0060132 A1* | 3/2018 | Maru | G06F 16/248 |
| 2018/0077077 A1 | 3/2018 | Fall et al. | |
| 2018/0083885 A1 | 3/2018 | Fall et al. | |
| 2018/0084034 A1* | 3/2018 | Stelmar Netto | H04L 41/0896 |
| 2018/0109920 A1 | 4/2018 | Aggarwal et al. | |
| 2018/0199199 A1* | 7/2018 | Boutnaru | H04W 12/08 |
| 2019/0266534 A1* | 8/2019 | Kessaci | G06Q 10/06315 |

OTHER PUBLICATIONS

International Search Report issued Mar. 31, 2020 in PCT/EP2019/086958 filed Dec. 23, 2019.
"Towards an Open, Disaggregated Network Operating System", AT&T Intellectual Property, 2017, pp. 1-17.
"Digital Single market", Towards 5G, 2018, https://ec.europa.eu/digital-single-market/en/towards-5g, pp. 1-2.
Wolpaw, J., et al. "Brain Computer Interface Technology: A Review of the First International Meeting", IEEE Transactions on Rehabilitation Engineering, vol. 8, No. 2, 2000, pp. 164-173.
Manzalini, A., "Virtual and augmented human intelligence module", Record of Invention VAHI—flow chart: A Celebration Day, Telecom Italia Tim Group, 2018, 9 total pages.
Japanese Office Action issued Dec. 15, 2023 in Japanese Patent Application No. 2021-537760 (with unedited computer-generated English translation), 6 pages.
European Office Action dated Apr. 18, 2024, issued in European Patent Application No. 19 824 368.5.

* cited by examiner

SYSTEM FOR PROVIDING A SERVICE

TECHNICAL FIELD

The present invention relates to the field of telecommunication and information communication technologies. In particular, the present invention related to a system for providing a service.

BACKGROUND ART

As known, the expressions "ubiquitous computing" and "pervasive computing" indicate the capability of computers and networks of computers of changing profoundly the relationship between digital technologies and physical space. Today the intertwining of several techno-economic drivers (e.g. diffusion of ultra broadband fixed mobile connectivity, progresses in technologies such as Software Defined Networks, Network Function Virtualization, Multi Access Edge Computing, Artificial Intelligence, Big Data, lowering costs etc.) is creating the conditions for a systemic digital transformation of our society.

For example, Virtual Reality (VR) systems are providing an artificial recreation/simulation of a real-life environment or situation. VR makes the users feel like they are experiencing and interacting with simulated reality first-hand.

Another example is Augmented Reality (AR). AR is used to augment real-life environments or situations and to offer users a perceptually enriched experience. AR technologies are overlaying information about real-life environments or situations and its objects on the real world.

Virtual assistants or intelligent personal assistants are becoming also very popular today. Virtual assistants or intelligent personal assistants are software agents that can perform tasks or services for a user.

The so-called "digital twins" are also known, which are software entities capable of integrating artificial intelligence, machine learning and software analytics with data to create living digital simulation models that update and change as their physical counter-parts change.

A massive integration of digital technologies and physical spaces requires the presence of a pervasive Software Defined Infrastructure (SDI) capable of creating a real unified standard cyber-environment. A SDI is a telecommunication infrastructure (including both network and IT resources) based on technologies such as Software-Defined Networks (SDN) and Network Functions Virtualization (NFV).

At the same time, the evolution of Cloud Computing towards Edge and Fog Computing represents another technology trend which is intercepting SDN and NFV in creating a distributed and pervasive SDI.

SUMMARY OF THE INVENTION

The Applicant has perceived that the ongoing digital transformation of our society is bringing a growing amount of available information and interactions opportunities. On the other hand, this is increasing the level of complexity in managing every-day life activities. In fact, every-day life activities comprise the ways in which people typically communicate, act, work, travel, think and feel daily. In this context people's real and virtual life will be more and more entangled and the two dimensions (physical and virtual) will smoothly interact providing a hybrid experience.

Hence, the Applicant has perceived the need to provide a system capable of supporting users in their every-day life activities in such scenario.

In this respect, the Applicant has noticed that the above-mentioned AR and VR systems exhibit some drawbacks. In particular, they lack of standard interoperable platforms, they have limited capability of interworking each other, being just vertical applications—wherein "vertical" means that their usability is limited to particular application areas, specific communities, etc.—running on top of current legacy telecommunication infrastructures. Moreover, they have also limited possibilities of taking real-time actions in real-life environments or situations. In this respect, current AR and VR user-experiences are isolated and lacking in universality (e.g. telephony and web).

As to current virtual assistants or intelligent personal assistants and digital twins, as AR and VR systems, they are vertical applications and lack a unified standard cyber-environment running on pervasive telecommunication infrastructures like SDI (Software Defined Infrastructure). They also lack any capability of taking proactive autonomous decisions to propose actions and services in real-life environments or situations. Furthermore, as current digital twins are mainly devoted to simulation or emulation environment, they lack any capabilities to make actuation in the real world.

In view of the above, the Applicant has tackled the problem of providing a system for providing a service which overcomes one or more of the aforesaid drawbacks.

In particular, the Applicant has tackled the problem of providing a system for providing a service to a user, which is capable of supporting the user in her/his every-day life activities, namely to augment her/his intelligence by representing her/him and acting, even proactively, by means of concrete actuation on her/his behalf on all physical resources.

The Applicant has also tackled the problem of providing a system for providing a service to a user, which overcomes the above limitations of the above known systems and applications and gets a universal service of human intelligence augmentation, wherein "universal" means fully interoperable, namely any application is capable of exchanging data and services in a consistent and effective way, facing different hardware and software platforms.

According to embodiments of the present invention, the above problems are solved by a system for providing a service comprising a module (also termed herein below "virtual and augmented human intelligence module" or, briefly, VAHI) associated with the user and configured to act on her/his behalf. The system also comprises a plurality of second modules (also termed herein below "virtual augmented entity modules" or, briefly, VAE), each one being associated with a respective physical resource (which may be a hardware entity, a software entity or a physical entity, such as a physical object, a system of physical objects or an individual) and configured to represent such physical resource. The system also comprises a runtime distributed execution environment for running VAHI and VAEs, the runtime distributed execution environment being provided with a distributed operating system supporting access by VAHI and VAEs to the physical resources. Upon reception of a service request from the user associated thereto, the VAHI interacts with the VAEs and, as a result of the interaction, provides the user with a proposal for fulfillment of her/his service request. Then, upon reception of an approval from the user, the VAHI instructs one or more VAEs to request the associated physical resources to perform actions fulfilling at least partially the service request according to the proposal.

As known, a distributed operating system is a globally distributed software over a collection of independent, networked, physical resources including the processing, storage-memory and networking resources of a SDI. The distributed operating system handles functions and services such as management, control and orchestration of all physical resources. Any individual physical resource holds a specific local software of the global distributed operating system.

The system according to embodiments of the invention exhibits several advantages over current virtual assistants or intelligent personal assistants and digital twins.

First of all, the runtime distributed execution environment supported by a distributed operating system enables a service universality which is not present in known virtual assistants or intelligent personal assistants or digital twins, which in turn may be considered as vertical applications. As known, indeed, in IT systems a runtime environment is defined as the execution environment provided to an application or software by the operating system. In a runtime environment, the application can send instructions or commands to the processor and access other IT system resources (such as RAM), which otherwise is not possible as most programming languages used are high level languages. Similarly to an application which, when executed in a runtime environment, is allowed to send instructions or commands to the processor and access other IT system resources, the VAHI and VAEs executed in the runtime environment are advantageously allowed to send instructions or commands to the physical resources.

VAHI and VAEs moreover have proactive capabilities leveraging on a knowledge acquired and/or shared in field and are determined by the learning system management functional blocks, which may be based on known artificial intelligence techniques (e.g. machine learning techniques such as: neural networks, nearest neighbor, K-means clustering, Naïve Bayes, regression, decision trees, etc.).

Further, VAHI and VAEs are able to infer and make decisions autonomously (leveraging on their knowledge acquired and/or shared in field), even without any human intervention, apart from the confirmation about the actuation commands to be sent to the physical resources.

Further, the VAHIs are advantageously capable of sharing the acquired knowledge, whenever it is necessary with other VAHIs and VAEs.

According to a first aspect, the present invention provides a system for providing a service to a user, the system comprising:
  a first module associated with the user and configured to act on her/his behalf;
  a plurality of second modules, each one of the second modules being associated with a respective physical resource and being configured to represent the respective physical resource; and
  a runtime distributed execution environment for running the first module and the plurality of second modules, the runtime distributed execution environment being provided with a distributed operating system supporting access by the first module and the plurality of second modules to the physical resources,
wherein the first module is configured to:
  have an interaction with the plurality of second modules and, as a result of the interaction, provide the user with a proposal for provision of the service; and
  upon reception of an approval from the user, instruct at least one of the plurality of second modules to request the associated physical resource to perform an action providing at least part of the service according to the proposal.

The first module may be capable of generating the proposal for provision of the service either upon reception of a service request from the user or proactively.

Preferably, also the plurality of second modules are capable of generating the proposal for provision of the service proactively.

Preferably, the system further comprises:
  a first directory accessible by the first module and by the plurality of second modules and containing first information relating to features of the first module, the first module being configured to update the first information based on outcome of previously provided services; and
  a second directory accessible by the first module and by the plurality of second modules and containing second information relating to features of the plurality of second modules, the second modules being configured to update the second information based on outcome of previously provided services;
wherein the proposal for provision of the service is formulated based on the first information stored in the first directory and/or the second information stored in the second directory.

Preferably, the first module and the plurality of second modules are based on artificial intelligence techniques executed either in cloud computing, edge computing or in local equipment.

At least one of the second modules may be associated with a complex physical resource composed by a number of monolithic physical resources, the second module being formed by a set of sub-modules, each sub-module being associated with a respective monolithic resource and being configured to represent the respective monolithic physical resource.

Preferably, the first module and the plurality of second modules are capable of being repeatedly instantiated.

According to embodiments, at least one of the second modules is also associated with the user, the least one of the second modules representing a skill and/or a service offered by the user as a physical resource.

The system may comprise at least one further first module associated with the user and configured to act on her/his behalf.

According to a second aspect, the present invention provides a method for providing a service to a user, the method comprising:
  providing a first module associated with the user and configured to act on her/his behalf; and
  providing a plurality of second modules, each one of the second modules being associated with a respective physical resource and being configured to represent the physical resource,
  providing a runtime distributed execution environment for running the first module and the plurality of second modules, the runtime distributed execution environment being provided with a distributed operating system supporting controlled access of the first module and the plurality of second modules to the physical resources,
wherein the method further comprises, by the first module:
  having an interaction with the plurality of second modules and, as a result of the interaction, providing the user with a proposal for provision of the service; and upon reception of an approval from the user, instructing at least one of the plurality of second modules to request the associated physical resource to perform an action providing at least part of the service according to the proposal.

According to a third aspect, the present invention provides a computer program product comprising instructions which, when the program is executed by at least one computer, causes the at least one computer to carry out the steps of the method as set forth above.

BRIEF DESCRIPTION OF THE DRAWINGS

The present invention will become clearer from the following detailed description, given by way of example and not of limitation, to be read with reference to the accompanying drawings, wherein.

DETAILED DESCRIPTION OF PREFERRED EMBODIMENTS OF THE INVENTION

Figure 1:
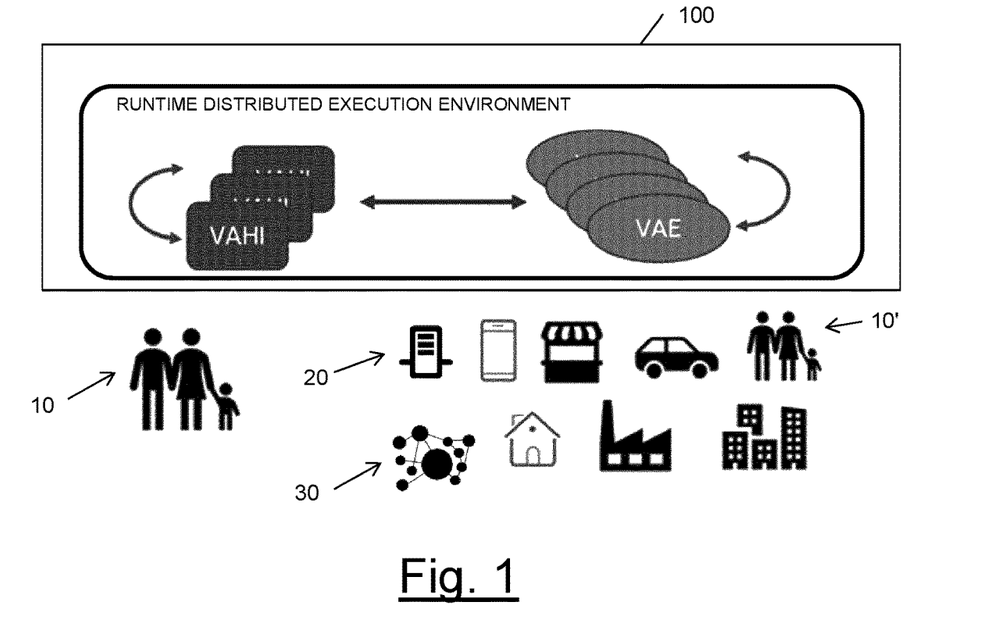
FIG. 1 schematically shows the structure of a system for providing a service according to embodiments of the present invention.

FIG. 1 schematically shows the system for providing a service according to embodiments of the present invention.

The system 100 comprises one or more first modules, also termed herein after "virtual and augmented human intelligence modules" (or, briefly, VAHI) and a plurality of second modules, also termed herein after "virtual augmented entity module" (or, briefly, VAE).

Each VAHI is associated with a respective user 10 and is capable of acting on her/his behalf.

Each VAE is associated with a respective physical resource. The physical resource may comprise a hardware entity (e.g. SDI hardware resources, such as network apparatus), a software entity (e.g. SDI software resources or functionalities) or a physical entity, such as a physical object 20 (a restaurant, a shop, a car, etc.), a system of physical objects 30 (a network of SDI hardware and software resources, a smart city, smart factory, etc.) or an individual 10'. Each VAE is configured to represent the associated physical resource in the virtual space where the VAHIs represent the users 10.

As far a SDI resources is concerned, it shall be noticed that the SDI basically is the infrastructure allowing the system 100 to operate, since it provides all the basic connectivity and IT (processing, computing, storing, etc.) capabilities required to support a distributed application such as the system 100. The SDI may be for example a 5G (5th Generation) telecommunication infrastructure as defined at the URL: https://ec.europa.eu/digital-single-market/en/towards-5g.

Each VAHI basically is a software module or, more specifically, a distributed process/application (it may also be seen as a de-materialized and distributed robot) configured to browse the web, make interactions and negotiations with other VAHIs, contact monitoring points (sensors, cams, etc.), elaborate, store and exchange big data and take decisions according to the wishes and the will of the user 10 it represents.

Also each VAE basically is a software module or, more specifically, a process/application configured to provide and consume data relevant with the associated physical resource and expose and consume services. The VAEs shall also be able to actuate on the associated physical resources the set of commands supporting the exposed services.

It should be noted that a same individual can be associated to both a VAHI and a VAE with different goals:

as a user, an individual may be associated with a VAHI supporting her/him in her/his every-day life activities and satisfying her/his needs and service requests by augmenting her/his intelligence and acting on her/his behalf (consumer role);

the same individual may also be associated with a VAE abstracting and virtualizing skills and/or services (e.g. professional services) that she/he can offer (producer role).

Multiple instances of VAHI and VAE are preferably able to interact with each other, providing and consuming data and services to support the users 10 in their every-day life activities, as it will be described in detail herein below.

Generally speaking, in computing systems the role of the Operating Systems (OS) is providing controlled access to high-level abstractions for the hardware resources (e.g., memory, storage, communication) and information (e.g., files, directories).

The system 100 preferably comprises a runtime distributed execution environment for running VAHIs and VAEs. Service universality is enabled by said runtime distributed execution environment leveraging on the abstractions of all the physical resources (including SDI ones) as virtualized by VAHIs and VAEs.

The runtime distributed execution environment is provided to VAHIs and VAEs by a distributed operating system which supports controlled access by VAHIs and VAEs to all physical resources. In the runtime distributed execution environment, the VAHIs and VAEs can exchange information and send instructions or commands to all physical resources.

For example, the distributed OS described in the patent application WO 2017/005329 in the name of the same Applicant may be used by the system 100. Alternatively, other distributed operating system may be used, such as ONOS (https://onosproject.org/) or the distributed operating system described by the paper "Towards an Open, Disaggregated Network Operating System" retrieved at the URL: https://about.att.com/content/dam/innovationblogdocs/att-routing-nos-open-architecture_FINAL%20whitepaper.pdf.

The physical infrastructure supporting communications, storage/memory and computing is preferably highly distributed, with cloud and edge/fog computing resources interconnected by fixed and mobile connections with high capacity and low latency (e.g. as for the 5G).

Preferably, the runtime distributed execution environment is configured to support the lifecycle of VAHIs and VAEs and respective directories, which are also part of the system 100 and which are called herein after "VAHI directory" and "VAE directory". VAHI directory and VAE directory are preferably stored (e.g. in the cloud and edge/fog computing resources) in a way to be accessible by VAHIs and VAEs anytime from anywhere with any terminal.

The abstraction models of VAHI and VAE are called herein below "archetypes". These archetypes are configured during the initial phase of instantiation of VAHI and VAE with a push mode. During this phase, VAHI directory and VAE directory are populated with static and dynamic information.

As mentioned above, each VAE is univocally associated to a physical resource 10', 20, 30 of the reality (hardware, software, physical) of which it represents the virtual abstraction capable of exposing APIs, methods and data. VAEs can be accessed by any VAHI and VAE.

Each VAE is instantiated by the owner or responsible of the physical resource 10', 20, 30 it represents, by configuring the related VAE archetype.

Figure 2:
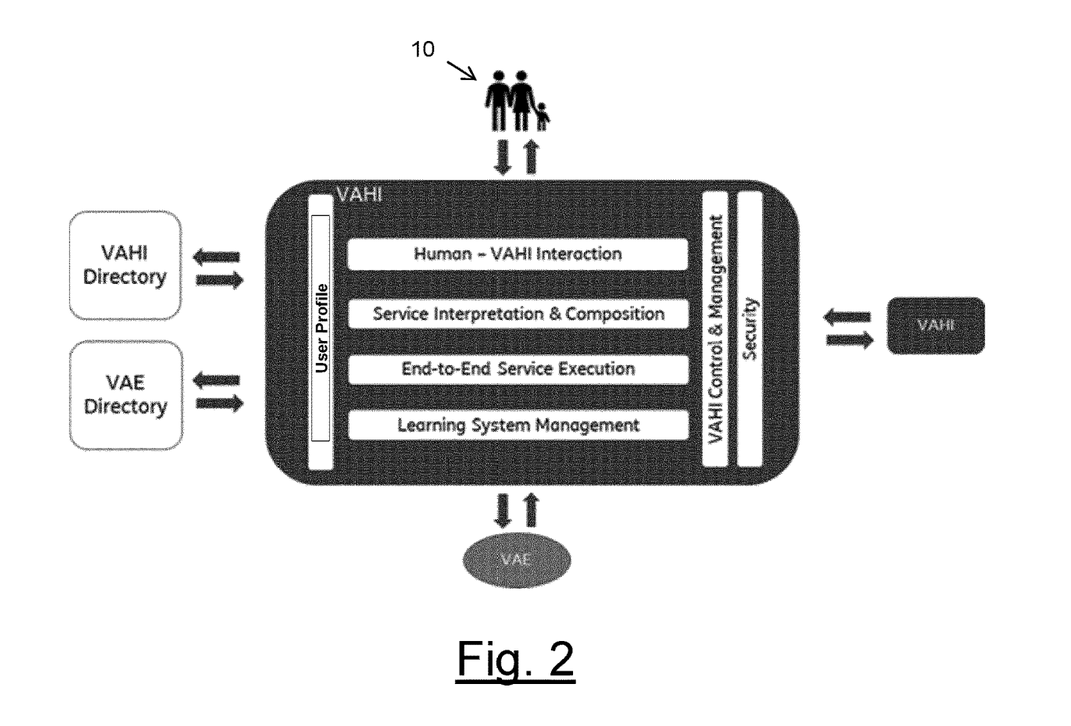
FIG. 2 shows in further detail the structure of a VAHI according to an embodiment of the present invention.

With reference now to FIG. 2, as mentioned above each VAHI of the system 100 is a software univocally associated to a user 10, that is configured to represent this user 10 and is capable of acting on his/her behalf in a hybrid real-virtual space.

Each VAHI is preferably based on artificial intelligence (AI) techniques executed either in the cloud computing or in the edge computing or in a local equipment (e.g. a fixed or mobile terminal). For example, it may be developed using machine learning techniques, such as neural networks, nearest neighbor, K-means clustering, Naïve Bayes, regression, decision trees, etc. Each VAHI may also be based on quantum machine learning techniques enabled by quantum computing capabilities.

The functional architecture of each VAHI preferably comprises a plurality of functional blocks.

A first functional block of a VAHI is a human-VAHI interaction block configured to support the interaction between the VAHI and the associated user 10. The interaction can be voice-enabled, supported by natural language processing techniques, or text-based by using text messaging (e.g. chatbots), touch interactions, or a combination of the above, or via any other form of interaction (e.g. brain computer interfaces) as those disclosed by Wolpaw, J. R. et al. "Brain-Computer Interface Technology: A Review Of The First International Meeting", IEEE Transactions On Rehabilitation Engineering, Vol. 8 NO. 2, pages 164-173.

Interactions between user 10 and VAHI are preferably related to the execution of a service request or to the control and management activities that are in charge of the user 10 associated to the VAHI. In particular, the human-VAHI interaction block preferably supports the capabilities enabling the user 10 associated to the VAHI to configure and update, during the life-cycle of the VAHI, the data stored in the user profile block and/or in the VAHI directory that are in charge to the user 10.

Moreover, this functional block is responsible for the data routing towards the user profile block and/or in the VAHI directory.

A further functional block of a VAHI is a service interpretation & composition block, which is preferably responsible for the interpretation of the service request and for the subsequent composition of the service chain, wherein the expression "service chain" designates a sequence of service components that shall be executed for fulfilling the service request.

This functional block preferably interacts with VAHI directories and the VAE directories for discovering the VAHIs and the VAEs that shall be involved for fulfilling the service request.

Moreover, this functional block is preferably configured to interact with a user profile functional block (which will be described in detail herein below) to retrieve information related to the habits, wishes, characteristic and delegation rules of the user 10, that are relevant for the service execution.

The service interpretation & composition block preferably supports one or more of the following capabilities:
  end-to-end analysis of the service request received from the human-VAHI interaction functional block;
  VAHIs discovery to identify other VAHIs potentially involved for the service fulfillment. This discovery is preferably accomplished by interacting with the VAHI directories storing information related to other VAHIs that are instantiated (XD Interface, which will be described in detail herein below);
  VAEs discovery to identify VAEs that support the service components to be executed for fulfilling the service request. This discovery is preferably accomplished by interacting with the VAE directories that store information related to the VAEs that are instantiated (YD interface, which will be described in detail herein below);
  retrieval of information related to habits, wishes, features and delegation rules of the user 10, that are relevant for the service execution. This action is preferably accomplished by interacting with the user profile functional block that contains this information; and
  composition of the service chain on the basis of the discovered VAHIs, VAEs and the information retrieved from the user profile block.

A further functional block of a VAHI is an end-to-end service execution block responsible for the execution of the service chains. This functional block preferably interacts with at least one of:
  the above described service interpretation & composition functional block for the receipt of the service chains;
  other VAHIs involved in the service chain execution (through a II interface, which will be described in detail herein below);
  the VAEs supporting the service components that shall be executed for fulfilling the service request (through a VV Interface, which will be described in detail herein below); and
  the above described human-VAHI interaction functional block to ask the user for any authorization or confirmation relating to the execution of a service request and to send to the user 10 the results obtained through the execution of the service chain.

The end-to-end service execution block preferably also supports one or more of the following capabilities:
  end-to-end feasibility verification, preferably comprising the following steps:
    verification of availability to the collaboration of the VAHIs involved in the execution of the service chain (if any);
    verification of technical feasibility for the execution of the service components supported by the VAEs; and
    end-to-end collection of the above verifications and preparation of a proposal for execution of the service chain.
  verification of the approval of the proposal by the user 10 for execution of the service chain, if necessary;

activation of the VAEs for the execution of the service components of the service chain; and collection of the results of the execution of the service components and sending the same to the user 10.

As a further functional block, each VAHI of the system 100 also preferably comprises a learning system management block, which preferably is responsible for tuning and managing an artificial intelligence (AI) tool supporting automatic and self-learning capabilities of the VAHI (e.g. the above described human-VAHI interaction block, service interpretation & composition block and end-to-end service execution block).

The learning system management block is preferably based on known artificial intelligence techniques. For example, it could be developed using machine learning techniques such as neural networks, nearest neighbor, K-means clustering, Naïve Bayes, regression, decision trees, etc. The learning system management block can also be based on quantum machine learning techniques enabled by quantum computing capabilities.

The learning system management block preferably provides the VAHI with proactive capabilities leveraging on a knowledge acquired and/or shared in field. For example, the learning system management block may support the VAHI capability to alert the user 10 about events (e.g., strikes, bad weather) and services of interest.

Moreover, the learning system management block preferably provides the VAHI with the capability to infer and make decisions automatically (leveraging on its knowledge acquired and/or shared in field), even without any human intervention, apart a former decisional delegation by the user (delegation rules).

The learning system management block preferably supports one or more of the following capabilities:

initial training and tuning of AI algorithms and models;

continuous automatic tuning of the AI algorithms and models on the base of the result of the execution of the service chain and the feedbacks received by the user 10;

continuous and automatic update of the data relevant for the user profile block and VAHI directory (through an XD interface, which will be described in detail herein below);

data analytics on the VAHI performance in terms of user satisfaction—that is, the level of compliance of the results of the service chain execution with respect to the expectations of the user 10—and of operational efficiency; and autonomous decision and service propositions.

As a further functional block, each VAHI of the system 100 also preferably comprises a VAHI control & management block responsible for the control and management of the VAHI itself.

Most of the capabilities of this functional block are preferably reserved for the administrator of the system 100. However, a subset of them may be made available to the user 10 to whom the VAHI is associated. Said capabilities preferably comprise one or more of:

configuration of methods and data exposed on the interfaces of the VAHI in relation to the confidentiality of the same; and configuration of the relations between the VAHI and the VAEs under the exclusive control of the VAHI.

As a further functional block, each VAHI of the system 100 also preferably comprises a security block responsible for the security management of VAHI. This functional block preferably supports one or more of the following capabilities:

security management on the exposed interfaces to avoid malicious attacks (e.g. denial of service, distributed denial of service, phishing); and management of consent for the execution of requests sent by VAHIs to VAEs under the exclusive control of another VAHI.

As a further functional block, each VAHI of the system 100 also preferably comprises a user profile block responsible for dynamic collection and storage of information indicative of habits, preferences and features peculiar of the user 10 to whom the VAHI is associated.

The user profile block is preferably consulted by the above described service interpretation & composition functional block to identify information related to habits, wishes, features and delegation rules of the user 10, that are relevant for the service execution.

The user profile block preferably is initially configured during the instantiation phase of the VAHI's archetype. Then, it is preferably dynamically updated by the above described learning system management block (i.e. the learning skills of the VAHI) and by the user 10 during the entire life cycle of the VAHI.

During the initial configuration phase, the user 10 associated to the VAHI may play an active role for the explicit supply of information related to her/his habits, wishes, features and delegation rules through a standard interface that directs a predefined series of questions.

Examples of such information are: identity data, gender, skills, preferences, hobbies, photos, delegation rules about VAHI automatic decisions, etc.

This information may be partially disclosed at the discretion of the user 10. For security reasons, certain attributes of the user profile block must be accessible by any security authority.

Figure 3:
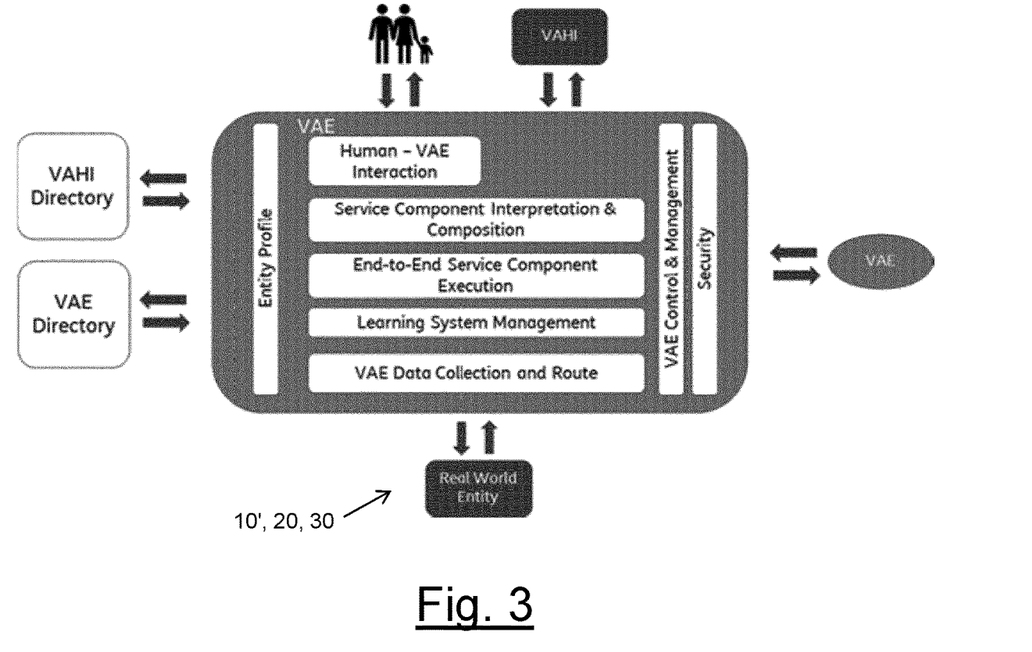
FIG. 3 shows in further detail the structure of a VAE according to an embodiment of the present invention.

With reference now to FIG. 3, as mentioned above a VAE is univocally associated to a physical resource hardware, software or physical (for example, a physical object 20, a system of physical objects 30 or an individual 10') of which it represents the virtual abstraction capable of exposing APIs, methods and data. In other words, the VAE is representing the services and/or the functions that the associated physical resource 10', 20, 30 can perform in a real world. This is applicable also for individuals 10'. For example, a medical doctor 10' can configure his/her VAE to represent the professional services that he/she can offer to the community. Another example is the owner of a restaurant, who may decide to configure a VAE archetype of her/his restaurant to make it visible and in the condition to offer its services.

Each VAE is preferably based on artificial intelligence (AI) methods executed either in the cloud computing or in the edge computing or in a local equipment (e.g. a fixed or mobile terminal). For example, each VAE may be developed using machine learning techniques, such as neural networks, nearest neighbor, K-means clustering, Naïve Bayes, regression, decision trees, etc. Each VAE may also be based on quantum machine learning techniques enabled by quantum computing capabilities.

In case the physical resource is not monolithic (e.g. a complex system 30 like a smart factory or a smart city) then the VAE associated with this physical resource 30 is preferably decomposed into a set of VAEs associated with each of the physical sub-entities of which it is made (lower level VAEs). Such kind of VAE (higher level VAE) can be instantiated if and only if at least two lower level VAEs are already instantiated. For example, a VAE for a smart city can be instantiated if and only if a VAE for city traffic management system and a VAE for the city waste management system already exist. Such rule preferably is embedded in the archetype of a VAE associated with a physical resource which is not monolithic. The relationship between higher and lower level VAEs preferably is registered in the VAE descriptors and can dynamically change.

The functional architecture of each VAE preferably comprises a plurality of functional blocks.

In particular, each VAE of the system 100 preferably comprises a human-VAE interaction block configured to support the interaction between the VAE and an individual, typically the owner or responsible of the physical resource 10', 20, 30 associated with the VAE. The interaction can be voice-enabled, supported by natural language processing techniques, or text-based by using text messaging (e.g. chatbots) or via any other form of interaction as described above. Touch interactions may also be used.

Preferably, the human-VAE interaction block is configured to support the capabilities enabling the owner or responsible of a physical resource 10', 20, 30 to configure and update, during the life-cycle of the VAE, the data stored in the entity profile block (which will be described in detail herein below) and/or in the VAE directory, that are in charge of said entity.

Moreover, the human-VAE interaction block preferably is responsible for the data routing towards the entity profile block and/or in the VAE directory.

As a further block, each VAE of the system 100 preferably comprises a service component interpretation & composition block responsible for the interpretation of a service component request and for the possible composition of a service sub-chain, if the VAE is not monolithic. In this case, the service component interpretation & composition block preferably interacts with the VAE directories for discovering the VAEs associated with the physical sub-entities to be involved for fulfilling the service request.

If necessary, the service component interpretation & composition block interacts with the entity profile functional block to identify parameters and information relevant for the service execution.

If the VAE is monolithic (namely its associated physical resource 10', 20, 30 is able to fully support the execution of the service component request) the service component interpretation & composition block preferably activates the end-to-end service component execution functional block for the execution of the service component request.

The service component interpretation & composition preferably supports one or more of the following capabilities:
  end-to-end analysis of the service component request received from the VAHI or from the VAEs belonging to a higher hierarchical level;
  VAEs discovery to identify VAEs potentially involved for the service sub-chain fulfillment. This discovery is accomplished by interacting with the VAE directories (through a ZD interface, which will be described in detail herein below);
  VAHIs discovery to identify VAHIs potentially involved for the service sub-chain fulfillment. This discovery is preferably accomplished by interacting with the VAHI directories that store information related to the VAHI that are instantiated (through a KD Interface, which will be described in detail herein below);
  retrieval of information relevant for the service components execution. This action is preferably accomplished by interacting with the entity profile functional block that contains said information;
  composition of the service sub-chain on the base of the discovered VAEs and VAHIs;
  sending the service sub-chain to the end-to-end service execution functional block; and
  sending a service component execution request to the end-to-end service execution functional block, if the VAE is monolithic.

As a further functional block, each VAE of the system 100 preferably comprises an end-to-end service component execution block responsible for the execution of the service sub-chains and of the service component execution request (if the VAE is monolithic).

This functional block preferably interacts with one or more of:
  service component interpretation & composition block for the receipt of the service sub-chains;
  other VAEs, through an EE interface (which will be described in detail herein below), for the execution of the service components supported by said VAEs associated with the physical sub-entities (part of the service sub-chain); and
  the associated physical resource for sending an action requests, through a VP interface (which will be described in detail herein below).

Further, the end-to-end service component execution block preferably supports one or more of the following capabilities:
  end-to-end feasibility verification, preferably comprising the following steps:
    verification of availability to the collaboration of the VAEs and, potentially the VAHIs, involved in the execution of the service sub-chain (if any);
    verification of technical feasibility for the execution of the service components supported by the VAEs involved in the execution of the service sub-chain (if any). In case the VAE is monolithic (no service sub-chain), this functional block preferably verifies the technical feasibility of the service component execution request by accessing, through a ZD interface (which will be described in detail herein below), the VAE directory (status information) and the entity profile block for the verifying the entity attributes useful for determining the technical feasibility; and
    end-to-end collection of the verifications and preparation of a proposal for execution of the service sub-chain (if any);
  activation of the VAEs for the execution of the service components of the service sub-chain through an EE interface (which will be described in detail herein below);
  forwarding the action requests to the associated physical resource 10', 20, 30 (e.g., actuations, data and state configurations, data discovery in pull mode) and for receiving the action responses related to actuation of actions on the physical resource, in case the VAE is monolithic;
  collection of the results of the execution of the service components and sending the same to the requesting VAHI or VAE (in case of sub-chain) applicant individual; and
  sending the action requests (e.g., actuations, data and state configurations, data discovery in pull mode) and for receiving the action responses related to actuation of actions on the physical resource.

As a further functional block, each VAE of the system 100 preferably comprises a VAE data collection and route block responsible for collecting, elaborating and routing data received from a physical resource (push mode). Such data may be stored in the VAE directory (VAE descriptor, in particular) and/or in the entity profile block.

As a further functional block, each VAE of the system 100 preferably comprises a learning system management block responsible for tuning and managing artificial intelligence (AI) tools supporting the automatic and self-learning capabilities of the VAE.

The learning system management block is preferably based on known artificial intelligence (AI) techniques. For example, it may be developed using machine learning techniques, such as neural networks, nearest neighbor, K-means clustering, Naïve Bayes, regression, decision trees, etc. The learning system management block may also be based on quantum machine learning techniques enabled by quantum computing capabilities.

The learning system management block preferably provides the VAE with proactive capabilities leveraging on a knowledge acquired and/or shared in field. For example, the learning system management block may provide the VAE with the capability of making autonomously service propositions to the VAHIs.

Moreover, the learning system management block may provide the VAE with the capability to infer and make decisions automatically (leveraging on its knowledge acquired and/or shared in field), even without any human intervention, apart the confirmation about the actuation commands to be sent to the physical resources.

The learning system management block preferably supports one or more of the following capabilities:
- initial training and tuning of AI algorithms and models;
- continuous automatic tuning of the AI algorithms and models on the base of the result of the execution of the service components and feedbacks received by the VAHIs (as from the users' feedback);
- continuous and automatic update of the data relevant for the entity profile block and the VAE directory;
- data analytics on the VAE performance in terms of VAHI satisfaction—that is, the level of compliance of the results of the execution of the service components and the feedbacks received by the VAHIs (as from the users' feedback)—and of operational efficiency; and
- autonomous decision and service propositions.

As a further functional block, each VAE of the system 100 preferably comprises a VAE control & management block responsible for the control and management of the VAE itself.

Preferably, most of the capabilities of the VAE control & management block are reserved for the administrator of the system 100. However, a subset of such capabilities may be made available to the individual who configured the VAE. Said capabilities preferably comprise one or more of:
- creation and deletion of VAE instances;
- entity profile block configuration and update;
- configuration of the methods and data exposed on the interfaces of the VAE in relation to the confidentiality of the same; and
- configuration of the relations between the VAE instance and the VAHIs instances.

As a further functional block, each VAE of the system 100 preferably comprises a security block responsible for the security management of VAE instances. This functional block preferably supports one or more of the following capabilities:
- security management on the exposed interfaces to avoid malicious attacks (e.g. denial of service, distributed denial of service, phishing).
- management of consent for the execution of requests.

As a further functional block, each VAE of the system 100 preferably comprises an entity profile block which includes information, static and dynamic, relating to the physical resource 10', 20, 30 associated with the VAE.

The entity profile block is initially configured during the instantiation phase of the VAE archetype. Then, it is preferably dynamically updated by the above described learning system management functional block (i.e. the learning skills of the VAE) and by the owner or responsible of the physical resource during the entire life cycle of the VAE. During the initial configuration phase, the owner or responsible of the physical resource 10', 20, 30 may have an active role in filling the entity profile block through a specific interface.

Examples of such static or dynamic information are: menu and opening/closure time for restaurants, goods brands, prices and availability, warehouse stocks for shops or on-line e-commerce, customers black/white list etc.

Herein below, the VAHI directory of a VAHI of the system 100 will be described in further detail.

A VAHI directory preferably is a collection of descriptors (also termed "VAHI descriptors") uniquely associated with the VAHI instances. A VAHI descriptor is created contextually to the instantiation and the initial configuration of a VAHI.

The VAHI directory and related VAHI descriptors are preferably dynamically updated in real time by the related VAHIs, according to the life cycle of the VAHI instances.

A VAHI descriptor preferably contains static and dynamic information that describes features of the associated VAHI. Static information by definition relate to features that determine the stable and perpetual aspects and capacities of the VAHI, while the dynamic ones may vary over time to represent continuously evolving features.

By way of non limiting example, the static information may include one or more of:
1. a unique identifier of the VAHI (e.g., URL for WEB site);
2. name and surname of the associated user 10; and
3. further optional information (e.g. instantiation date).

By way of non limiting example, the dynamic information may include one or more of:
1. status of the VAHI (e.g., on-line/off-line, busy/free);
2. VAHI performance in terms of user satisfaction;
3. list of all VAHI instances associated to the user 10; and
4. list of the VAE instances under the exclusive control of the VAHI.

The VAHI directory is preferably accessed by the service interpretation & composition functional block which, as described above, is responsible for the interpretation of the service request and for the subsequent composition of the service chain. Specifically, this allows discovering the VAHIs that shall be involved for fulfilling the service request.

Herein below, the VAE directory of a VAE of the system 100 will be described in further detail.

A VAE directory preferably is a collection of descriptors (also termed "VAE descriptors") uniquely associated with the VAE instances. A VAE descriptor is created contextually to the instantiation and the configuration of a VAE.

For each type of VAE archetype (e.g. restaurant, car dealer, on-line bank) preferably there is a guided menu that allows an assisted and standard generation of the VAE descriptor.

The VAE directory and the related VAE descriptors preferably are dynamically updated in real time by the related VAEs, according to the life cycle of the VAE instances.

A VAE descriptor may contain static and dynamic information that describes features and capabilities of the associated VAE. The static information by definition relates to features that determine the stable and perpetual aspects and capacities of the VAE, while the dynamic ones may vary over time to represent continuously evolving features.

By way of non limiting example, the static information may include one or more of:
1. a unique identifier of the VAE (e.g., URL for WEB site);
2. a class to which the VAE belongs to (e.g. restaurant, on-line bank, flower shop, business activity, smart city, etc.);
3. monolithic VAE or not (in case of complex system 30);
4. naming and spatial attributes (e.g. name, country, city, street); and
5. exposed methods and data (e.g. car sales, leasing services, long term rental, car maintenance, etc.).

By way of non limiting example, the dynamic information may include one or more of:
1. a list of all VAE instances associated to the same physical resource 10', 20, 30;
2. a list of the associated VAEs (lower level) in case the VAE (higher level) is associated with a complex system 30;
3. groups having the same attributes to which the VAE belongs to (e.g. type of food, discounts, reputation, performance, etc.);
4. status (e.g., on-line/off-line, busy/free);
5. performance of the VAE (e.g. number of service requests successfully completed, quality of the exposed data, percentage of availability/unavailability); and
6. reputation of the VAE (e.g. satisfaction level of the users).

The VAE directory is preferably accessed by the above described service interpretation & composition functional block, which is responsible for the interpretation of the service request and for the subsequent composition of the service chain. Specifically, this allows discovering the VAEs to be involved for fulfilling the service request. A VAE directory is preferably accessed by the service component interpretation & composition block to identify VAEs to be potentially involved for the service sub-chain fulfillment.

Figure 4:
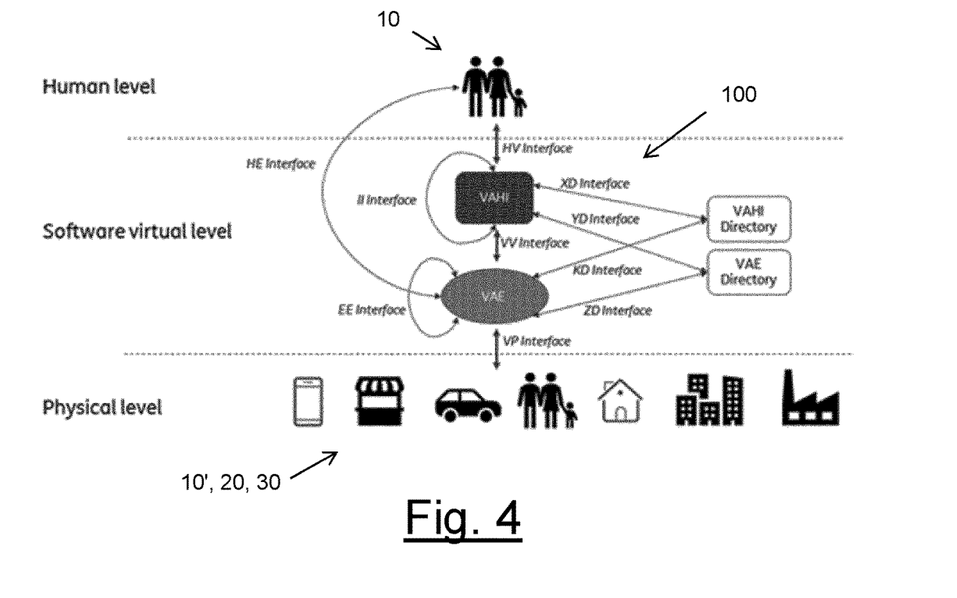
FIG. 4 shows in further detail the interaction between the system according to embodiments of the present invention, the human level and the physical level.

With reference now to FIG. 4, the interfaces between the system 100 and the human level (user 10) and physical level (physical resources 10', 20, 30) will be now described in further detail.

As to the HV (Human-VAHI) interface, it is configured to support interaction between user 10 and VAHI. Mostly, but not limited to, HV interface supports exchanges of messages enabling the service execution, including one or more of:
service request: this message contains detailed information about a service request from user 10;
service execution proposal: this message contains a proposal from VAHI for the best execution of the service request. The proposal, with possibly information allowing the user 10 to decide whether to approve the proposal or not, is addressed to the user 10 and is aimed at obtaining her/his approval or disapproval;
acknowledgement: this message contains the approval (ok) or the disapproval (ko) of the user 10 to the VAHI's proposal;
service execution confirmation: this message, sent by VAHI to the user 10, confirms the execution of the service request and reports the results;
service quality feedback: this message sent by the user 10 to the VAHI contains a feedback of the user 10 about the perceived quality of the requested service;
service cooperation authorization request: this message sent by the VAHI to the user 10 requests an authorization to cooperate following to reception of a service cooperation request received from another VAHI;
service cooperation authorization response: with this message, the user 10 confirms or denies the service cooperation authorization request previously received from its VAHI;
VAHI attribute configuration: this message allows the user 10 to configure and update the information comprised in the user profile block and the VAHI directory, both during the VAHI instantiation phase and its lifecycle. The user 10 preferably supplies the information through a standard interface that directs a predefined series of questions; and
alert and service proposition: with this message, a VAHI sends autonomously and proactively an alert or a service proposition to the user 10. If the user 10 likes a service proposition, then a service request is created by the user 10.

As to the VV (VAHI-VAE) interface, it preferably supports the interaction between VAHI and VAE. Mostly, but not limited to, the VV interface supports exchanges of messages enabling the consumption of data and services exposed by the VAE. By way of not limiting example, such messages may include one or more of:
service component verification request: with this message a VAHI requests a VAE to verify if an instance of service component could be executed;
service component verification response: with this message a VAE confirms or denies the possibility to execute an instance of the requested service component. In positive case, the message contains a feasibility proposal;
service component execution request: with this message a VAHI requests a VAE to execute a service request previously verified;
service component execution response: this message, sent by a VAE to a VAHI, contains the result of the execution of a service component execution request;
service component execution quality feedback: with this message, a VAHI sends a feedback to a VAE about the perceived quality of the requested service component execution (as from the feedback from user 10 as received by the VAHI);
authorization request: with this message, a private VAE (whatever its hierarchical level) requests its VAHI the authorization to respond to a service component verification request coming from another VAHI;
authorization response: with this message, a VAHI confirms or denies the authorization request to its private VAE;
service cooperation request: this message enables a VAE to request other VAHIs to cooperate for realizing service components part of a service sub-chain;
service cooperation response: with this message VAHIs can answer to a service cooperation request received by a VAE;

service proposition: with this message, a VAE sends autonomously and proactively a service proposition to VAHIs. If the VAHIs, or the associated users 10, like said service proposition, then a service request is automatically created by the VAHIs (in case that such decision is included in the delegation rules) or by the users 10.

As to the VP (VAE-Physical resource) interface, it preferably supports the interaction between a VAE and the associated physical resource 10', 20, 30. For example, the VP interface may support exchange of messages for both data gathering from the physical resource 10', 20, 30 and the actuation of actions on the physical resource 10' 20, 30. Such messages may comprise one or more of:

data update: this message enables the physical resource 10', 20, 30 to update its associated VAE about all the relevant data related to the physical resource 10', 20, 30 and its lifecycle (push mode);

action request: this message enables a VAE to request the physical resource 10', 20, 30 to execute actions like, but not limited to, the execution of supported capabilities, data and state configuration, data discovery (pull mode);

action response: this message, sent by a physical resource 10', 20, 30 to its associated VAE, contains the result of the action (ok or ko)

As to the II (VAHI-VAHI) interface, it preferably supports the interaction between VAHIs. The II interface supports exchanges of messages enabling the cooperation and the coordination between multiple instances of VAHI, when such cooperation and coordination are necessary for supplying a service that involves more users. By way of non limiting examples, such messages may include one or more of:

service cooperation request: this message enables a VAHI to request another VAHI to cooperate for supplying the service requested by the user associated to the former VAHI;

service cooperation response: this message contains the answer to a service cooperation request.

The user 10 may have associated multiple VAHIs (e.g. one VAHI for working time, another for free time, etc.). In that case, the II interface shall support the partial or full sharing of the respective user profile blocks.

As to the EE (VAE-VAE) interface, it preferably supports the interaction between multiple instance of VAEs required for the service sub-chain execution. By way of not limiting example, the messages exchanged through the EE interface comprise one or more of:

service component verification request: with this message, a higher level VAE requests a lower level VAE to verify if an instance of service component could be executed;

service component verification response: with this message, a lower level VAE confirms or denies the possibility to execute an instance of the requested service component. In positive case, the message contains a feasibility proposal;

service component execution request: with this message, a higher level VAE requests a lower level VAE to execute a service request previously verified;

service component execution response: this message, sent by a lower level VAE to a higher level VAE, contains the result of the execution of a service component execution request;

service component execution quality feedback: with this message, a higher level VAE sends a feedback to the lower level VAE about the perceived quality of the requested service component execution (as from the users' feedback received by the VAHI).

As to the HE (Human-VAE) interface, it preferably supports the interaction between the individual who is the owner or responsible for the physical resource 10', 20, 30 and the VAE associated with such physical resource. By way of not limiting example, the messages exchanged through the HE interface comprise VAE attribute configuration message: this message allows the individual to configure and update the entity profile block and the VAE directory both during the VAE instantiation phase and its lifecycle. The individual supplies the information through a standard interface that directs a predefined series of questions.

As to the XD interface, it preferably supports interactions between a VAHI instance and the VAHI directory, related to configuration and discovery of the data recorded in the VAHI descriptors. The supported messages preferably include one or more of:

VAHI directory data configuration: this message supports the configuration of the data stored in the VAHI descriptor, both in the instantiation phase and during the life-cycle of the VAHI. These data are provided by the user 10 through the HV interface (as described above, the human-VAHI interaction block of the VAHI is responsible for the data routing towards the user profile block and/or in the VAHI directory); and VAHI directory data discovery: this message supports the discovery of the data stored in the VAHI descriptors.

As to the YD interface, it preferably supports interactions between a VAHI instance and the VAE directory, related to the discovery of the VAEs that support the service components that shall be executed for fulfilling the service request. The supported messages preferably include:

VAE directory data discovery: this message supports the discovery of the data stored in the VAE descriptors.

As to the KD interface, it preferably supports interactions between a VAE instance and the VAHI directory related to the discovery of the data recorded in the VAHI descriptors. The supported messages preferably include:

VAHI directory data discovery: this message supports the discovery of the data stored in the VAHI descriptors.

As to the ZD interface, it preferably supports interactions between a VAE instance and the VAE directory related to the configuration and the discovery of the data recorded in the VAE descriptors. The supported messages preferably include:

VAE directory data configuration: this message supports the configuration of the data stored in the VAE descriptor, both in the instantiation phase and during the life-cycle of the VAE. These data are provided by individuals through the HE interface (as described above, the human-VAE interaction block of a VAE is responsible for the data routing towards the entity profile block and/or in the VAE directory); and VAE directory data discovery: this message supports the discovery of the data stored in the VAE descriptors.

Figure 5:
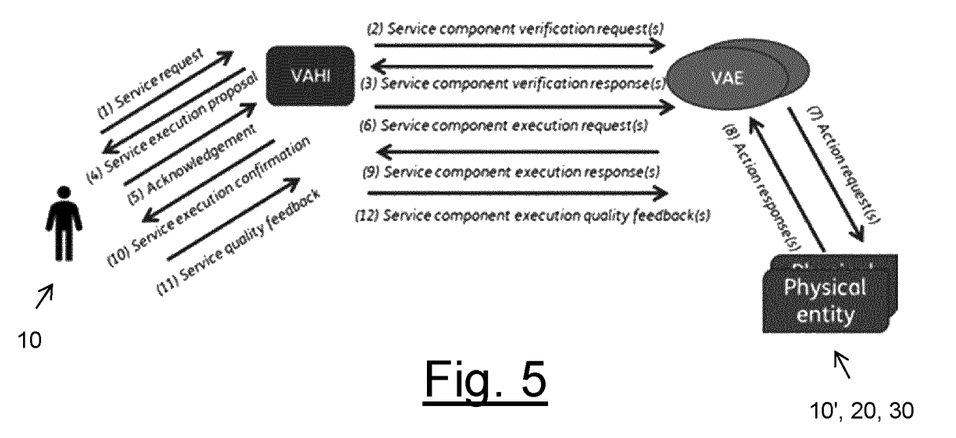
FIG. 5 shows an exemplary exchange of messages between the system according to embodiments of the present invention, a user requesting a service and a number of physical resources involved in the provision of the requested service.

FIG. 5 schematically depicts an exemplary exchange of messages between the user 10, the VAHI associated thereto, one or more VAEs associated with respective physical resources 10', 20, 30 and the physical resources 10', 20, 30 themselves.

The VAHI receives from the user 10 a service request (step 1) though the HV interface, the service request containing detailed information about a requested service.

Then, via the VV interface the VAHI preferably sends respective service component verification requests to one or more VAEs associated with the physical resources 10', 20, 30 to be possibly involved for supplying the requested service (step 2), by which the VAHI requests the VAE(s) to verify if an instance of service component could be executed.

Then, the VAE(s) preferably send to the VAHI respective service component verification responses (step 3) via the VV interface, by which each VAE confirms or denies the possibility to execute an instance of the requested service component. In positive case, the message contains a feasibility proposal.

Then, through the HV interface the VAHI preferably sends to the user 10 a service execution proposal (step 4), containing a proposal from VAHI for the best execution of the service requested.

Then, through the HV interface the VAHI preferably receives from the user 10 an acknowledgment (step 5) containing either the approval (ok) or the disapproval (ko) of the user 10 the service proposal.

Then, through the VV interface the VAHI preferably sends respective service component execution requests (step 6) to the VAEs associated with the physical resources 10', 20, 30 to be involved for supplying the requested service as approved by the user 10. By such messages, the VAHI requests the VAEs to execute the service request as approved by the user 10.

Then, each VAE receiving a respective service component execution requests preferably sends to the respective physical resource 10', 20, 30 an action request (step 7) via its VP interface. By such messages, each VAE requests the respective physical resource 10', 20, 30 to execute actions like, but not limited to, the execution of supported capabilities, data and state configuration, data discovery (pull mode).

Then, each VAE preferably receives from its associated physical resource 10', 20, 30 via the VP interface a respective action response (step 8) containing the result of the action (ok or ko).

Then, via the VV interface each VAE preferably sends to the VAHI a respective service component execution response (step 9) which contains the result of the execution of the corresponding service component execution request sent at step 6.

Then, via the HV interface the VAHI preferably sends to the user 10 a service execution confirmation (step 10), which confirms the execution of the service request and reports the results.

Then, via the HV interface the VAHI may receive from the user 10 a service quality feedback (step 11), by which the user 10 sends a feedback to the VAHI about the perceived quality of the requested service.

Then, via the VV interface the VAHI may send to the VAEs involved in the supplied service respective service component execution quality feedback(s) (step 12) containing feedbacks about the perceived quality of the requested service component execution (as from the user's feedback received by the VAHI).

Herein below, a use case will be described in detail with reference to an exemplary situation in which a user (Bob) wishes to celebrate the wedding anniversary with his wife Alice and he asks his VAHI to organize everything (e.g. restaurant booking, flower, car rental and optimized route selection).

Firstly, Bob's VAHI shall select and book a restaurant for Friday evening. Bob's VAHI knows also the preferences of Alice (Chinese restaurant) because it has previously shared such kind of information by interacting with the Alice's VAHI (through the EE interface). Bob's VAHI shall select the restaurant also considering a budget for the dinner.

Secondly, Bob's VAHI must buy some flowers for Alice and make it sure that flowers are sent to the restaurant.

Thirdly, Bob's VAHI must book a rental car to bring Bob and Alice to the restaurant along an optimized route (in terms of traffic and travel time). In this example, said route is preferably identified by the Bob's VAHI by interacting with the VAE associated with the city traffic management VAE (this task could be, alternatively, carried out by the VAE associated with the rental car office by interacting directly with the VAE associated with the city traffic management).

Figure 6:
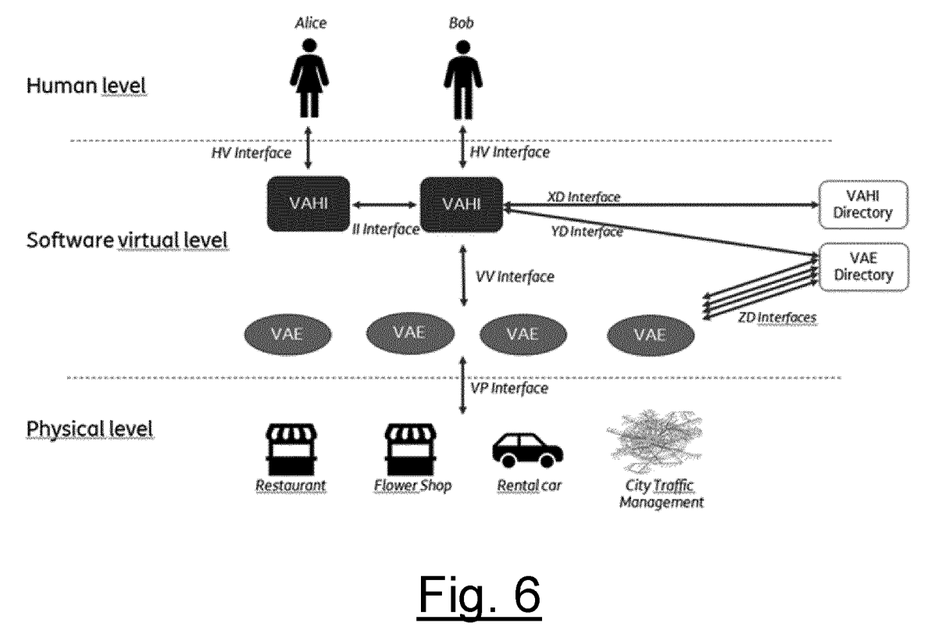
FIG. 6 shows the system according to the embodiments of the present invention in an exemplary use case.

FIG. 6 schematically shows a system 100 for providing the above service to Bob. In particular, the system 100 comprises Bob's VAHI, Alice's VAHI and four different VAEs, one for each physical resource to be involved for supplying the service requested by Bob, namely the restaurant, the flower shop, the car rental office and the city traffic management system. The system also comprises VAHI directory and VAE directory and the runtime distributed execution environment.

Figure 7:
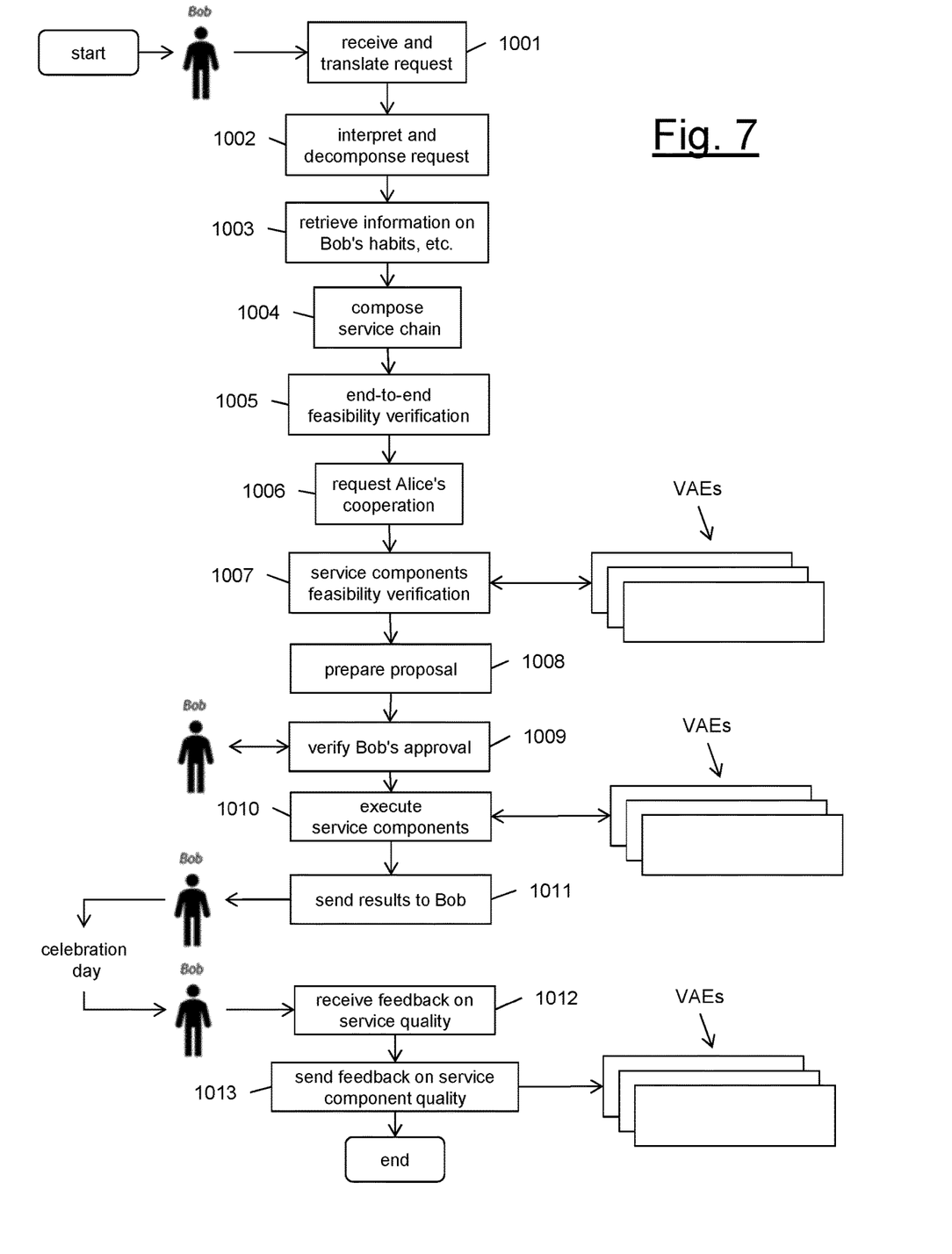
FIG. 7 is a flow chart of the operation of the system of FIG. 6.

With reference to FIG. 7, the system 100 is started as Bob's VAHI receives via its HV interface from Bob a service request (step 1001). The service request for example comprises the following detailed requests:

1) organizing a dinner;
2) buying flowers and delivering to the restaurant;
3) renting a car; and
4) identifying a car route.

At step 1001, as the human-VAHI interaction block of Bob's VAHI receives the service request, it preferably translates it in internal messages to be routed to the service interpretation and composition block of the VAHI.

Then, the service interpretation and composition block of Bob's VAHI interprets the service request and decomposes it into the four service components, one for each physical resource to be possibly involved (step 1002). At step 1002, the service interpretation and composition block preferably interacts with the VAHI directory and the VAE directory for discovering the VAHIs and the VAEs to be involved for the fulfillment of the service request. In particular, via the XD interface the service interpretation and composition block preferably discovers from VAHI directory the information contained in the VAHI descriptor related to Alice (e.g., unique identifier and status information). Further, via the YD interface the service interpretation and composition block preferably discovers from VAE directory the information contained in the VAE descriptors related to VAEs supporting the capabilities for the execution of the service components (restaurants, flower shops, renting car offices and city traffic management system).

Then, the service interpretation and composition block of Bob's VAHI preferably interacts with the user profile block of Bob's VAHI (step 1003) for retrieving information related to Bob's habits, wishes, characteristic and delegation rules, that are relevant for the service execution (e.g., preferred restaurant, budget, preferred car, etc.).

Then, the service interpretation and composition block of Bob's VAHI composes the service chain on the base of the discovered VAHIs, VAEs and the information retrieved from the user profile block (step 1004) and sends the service chain to the end-to-end service execution block.

Then, the end-to-end service execution block preferably receives the service chain and starts the end-to-end feasibility verification, interacting with the Alice's VAHI and the discovered VAEs (step 1005).

Then, the end-to-end service execution block preferably interacts with Alice's VAHI for collaboration (step 1006), e.g. for sharing the agenda and blocking the date, sharing the Alice habits like preferred food, flowers, etc. Such interaction preferably comprises an exchange of service cooperation request and service cooperation response via the II interface between Bob's VAHI and Alice's VAHI. Alice's VAHI may also interact with Alice for requesting her authorization to the cooperation. Such interaction may comprise an exchange of service cooperation authorization request and service cooperation authorization response between Alice's VAHI and Alice via the HV interface of Alice's VAHI.

Then, the end-to-end service execution block of Bob's VAHI preferably interacts with the previously discovered VAEs to verify the technical feasibility of the execution of the service components supported by the VAEs (step 1007). For this purpose, the end-to-end service execution block of Bob's VAHI preferably interacts with the VAEs of restaurants, car rental offices, flower shops and city traffic management system. Such interaction preferably comprises an exchange of service component verification requests and service component verification responses via the VV interface.

More particularly, with reference for example to the VAE of the restaurant, this a monolithic VAE. Hence, the service component interpretation & composition block only sends the service component verification request to the end-to-end service component execution block of the VAE. The end-to-end service component execution block of the VAE in turn preferably verifies the technical feasibility of the service component execution request by accessing, through the ZD interface, the VAE directory (status information on resource availability). This way, the VAE directory preferably provides the information contained in the VAE descriptor related to restaurant VAE related to the status of the entity (e.g. on-line, free). The end-to-end service component execution then accesses the entity profile block for verifying the entity attributes useful for determining the technical feasibility (e.g. table availability, menu, open/closure time). Then, the end-to-end service component execution block of the VAE preferably sends to Bob's VAHI the confirmation of the technical feasibility of the service component execution.

Then, the end-to-end service execution block of Bob's VAHI preferably collects the results of the aforementioned verifications and prepares a proposal for execution of the service chain (step 1008).

Then, the end-to-end service execution block of Bob's VAHI preferably verifies Bob's approval of the proposal for execution of the service chain (step 1009). For this purpose, Bob's VAHI preferably interacts with Bob via its HV interface. Such interaction preferably comprises an exchange of service execution proposal and acknowledgment via the HV interface. If Bob likes the proposal, he sends a positive acknowledgement (ok).

Then, the end-to-end service execution block of Bob's VAHI preferably activates the VAEs for the execution of the service components of the service chain (step 1010). For this purpose, the end-to-end service execution block preferably interacts again with the VAEs via the VV interface. Such interaction preferably comprises an exchange of service component execution requests and service component execution responses through the VV interface.

More particularly, with reference again for example to the VAE of the restaurant, the end-to-end service component execution block of the restaurant's VAE, upon reception of the service component execution request from Bob's VAHI, preferably sends an action request to the restaurant. The restaurant receives the request for booking a table for Bob and Alice and reserves it for the specified date and time. Then, it sends an action response to its associated VAE via the VP interface, for confirming the reservation. Upon reception of the action response from the restaurant, the end-to-end service component execution block of the VAE sends to Bob's VAHI a service component execution response that contains the result of the physical action, namely the successful reservation of the table for two people at the desired date and time. Similar steps are also performed by the VAEs of flower shop, rental car office and city traffic management system.

Then, the end-to-end service execution block of Bob's VAHI preferably collects the results of the execution of the service components (restaurant, flower shop, car rental office, city traffic management system) and sends them to Bob (step 1011). For this purpose, the end-to-end service execution block of Bob's VAHI preferably sends to Bob a service execution confirmation via the HV interface.

Then, Bob's VAHI may receive from Bob a feedback on the perceived service quality (step 1012). The feedback is preferably in the form of a service quality feedback received via the HV interface. As step 1012, the learning system management block may use the information contained in the service quality feedback to update the relevant data in user profile block (e.g. preferences) and in the VAHI directory (e.g. VAHI performance). In particular, the learning system management block may send VAHI directory data configuration via the XD interface to the VAHI directory, which updates the information related to the VAHI performance in terms of user satisfaction.

Then, upon the reception of the service quality feedback from Bob, the end-to-end service execution block of Bob's VAHI preferably sends service component execution quality feedbacks to the VAEs of restaurant, flower shop, car rental office and city traffic management system (step 1013). For this purpose, Bob's VAHI preferably sends to each VAE a respective service component execution quality feedback via the VV interface. The learning system management of each VAE preferably uses the information contained in the received service component execution quality feedback to update the relevant data in the entity profile block (e.g. customer white list) and in the VAE directory (e.g. VAE performance, reputation). In particular, the learning system management block may send to the VAE directory data configuration via the ZD interface to the VAE directory, which updates the information related to the VAE performance, in terms of user satisfaction, and reputation.

Even if in the above example the VAHI prepares a proposal upon reception of the service request from the user 10, this is not limiting. According to embodiments of the present invention, the VAHI is capable of proactively formulating proposals for services to its associated user 10, based on preferences and habits of its associated user 10 as specified in the user profile functional block of the VAHI itself. A proposal for a service for the user 10 may be proactively formulated also by the VAE representing a physical resource (e.g. a restaurant), always based on preferences and habits of the user 10 as specified in the user profile functional block of his/her associated VAHI.

The system 100 exhibits several advantages over known virtual assistants, or intelligent personal assistants, and digital twins.

First of all, the runtime distributed execution environment supported by a distributed operating system enables a service universality which is not present in known virtual assistant or intelligent personal assistant or digital twins, which in turn can be considered as vertical applications.

Then, the VAHI is a logically unique intelligent touch point (using a variety of possible interfaces) of a user for accessing the virtual space where all other VAHIs and VAEs are operating. Similarly, each VAE is a logically unique intelligent touch point (using a variety of possible interfaces) of a physical resource for accessing the virtual space where all other VAHIs and VAEs are operating.

Further, VAHIs and VAEs have proactive capabilities leveraging on a knowledge acquired and/or shared in field and are determined by the learning system management functional blocks, which are based on known artificial intelligence techniques (e.g. machine learning techniques such as: neural networks, nearest neighbor, K-means clustering, Naïve Bayes, regression, decision trees, etc.).

Further, VAHIs and VAEs are able to infer and make decisions autonomously (leveraging on their knowledge acquired and/or shared in field), even without any human intervention, apart the confirmation about the actuation commands to be sent to the physical resources.

Further, VAHI and VAE are capable of registering themselves automatically (after the instantiation phase) in the virtual space where they are operating.

Further, each VAE may have a recursive structure for complex systems. Also VAHI may have a recursive structure with several nested layers for abstracting the collective intelligence of social community of humans.

Further, the VAHIs are advantageously capable of sharing the acquired knowledge, whenever it is necessary with other VAHIs and VAEs.

The invention claimed is:

1. A system for supporting a user in every-day activities within a physical space using a virtual space, said system comprising:
   a first module, univocally associated with said user, configured to represent said user in the virtual space and act on behalf of the user, said first module including a user profile block responsible for dynamic collection and storage of information indicative of habits, preferences, and features of the user;
   a plurality of second modules, each one of said second modules being associated with a respective physical resource in the physical space and being configured to represent said respective physical resource in the virtual space;
   a runtime distributed execution environment for running said first module and said plurality of second modules, said runtime distributed execution environment being provided with a distributed operating system supporting access by said first module and said plurality of second modules to said physical resources in the physical space; and
   a first directory accessible by said first module and by said plurality of second modules and containing first information relating to features of said first module,
   wherein the first module and each of the plurality of second modules are distinct,
   wherein said first module is configured to:
      have an interaction in the virtual space with said plurality of second modules and, as a result of said interaction in the virtual space, provide said user with a proposal for provision of a service in the physical space based upon said preference and said habits of said user, where the interaction includes verification of feasibility for the provision of the service by said plurality of second modules; and
      upon reception of an approval from said user, instruct at least one of said plurality of second modules to request the associated physical resource to perform an action providing at least part of said service in the physical space according to said proposal,
   wherein said plurality of second modules are configured to access the first information relating to features of said first module of the first directory, and
   wherein the system further comprises:
   a second directory accessible by said first module and by said plurality of second modules and containing second information relating to features of said plurality of second modules, said second modules being configured to update said second information based on an outcome of previously provided services,
   wherein said first module is configured to update said first information based on an outcome of previously provided services,
   wherein said first information includes static information and dynamic information, the static information including perpetual aspects and perpetual capabilities of the first module, and
   wherein said proposal for provision of said service is formulated based on said first information stored in said first directory and/or said second information stored in said second directory.

2. The system according to claim 1, wherein said first module is configured to generate said proposal for provision of said service either upon reception of a service request from said user or proactively.

3. The system according to claim 1, wherein said plurality of second modules are configured to generate said proposal for provision of said service proactively.

4. The system according to claim 1, wherein said first module and said plurality of second modules are based on artificial intelligence techniques executed either in cloud computing, edge computing, or in local equipment.

5. The system according to claim 1, wherein
   at least one of said second modules is associated with a complex physical resource composed by a number of monolithic physical resources,
   said second module is formed by a set of sub-modules, and
   each sub-module is associated with a respective monolithic resource and is configured to represent said respective monolithic physical resource in the virtual space.

6. The system according to claim 1, wherein said first module and said plurality of second modules are capable of being repeatedly instantiated.

7. The system according to claim 1, wherein at least one of said second modules is also univocally associated with said user, said least one of said second modules representing a skill and/or a service offered by said user as a physical resource in the virtual space.

8. The system according to claim 1, comprising at least one further first module univocally associated with said user and configured to act behalf of the user.

9. A method for supporting a user in every-day activities within a physical space using a virtual space, said method comprising:
   providing a first module, univocally associated with said user, configured to represent said user in the virtual space and act on behalf of the user, said first module including a user profile block responsible for dynamic collection and storage of information indicative of habits, preferences, and features of the user;

providing a plurality of second modules, each one of said second modules being associated with a respective physical resource in the physical space and being configured to represent said physical resource in the virtual space;

providing a runtime distributed execution environment for running said first module and said plurality of second modules, said runtime distributed execution environment being provided with a distributed operating system supporting controlled access of said first module and said plurality of second modules to said physical resources in the physical space; and providing a first directory accessible by said first module and by said plurality of second modules and containing first information relating to features of said first module, wherein the first module and each of the plurality of second modules are distinct, wherein said method further comprises, by said first module:

having an interaction in the virtual space with said plurality of second modules and, as a result of said interaction in the virtual space, providing said user with a proposal for provision of a service in the physical space based upon said preference and said habits of said user, where the interaction includes verification of feasibility for the provision of the service by said plurality of second modules; and upon reception of an approval from said user, instructing at least one of said plurality of second modules to request the associated physical resource to perform an action providing at least part of said service in the physical space according to said proposal, wherein said method further comprises, by said plurality of second modules:

accessing the first information relating to features of said first module of the first directory, and providing a second directory accessible by said first module and by said plurality of second modules and containing second information relating to features of said plurality of second modules, said second modules updating said second information based on an outcome of previously provided services, wherein said first module updates said first information based on an outcome of previously provided services, wherein said first information includes static information and dynamic information, the static information including perpetual aspects and perpetual capabilities of the first module, and wherein said proposal for provision of said service is formulated based on said first information stored in said first directory and/or said second information stored in said second directory.

10. A non-transitory computer-readable medium encoded with computer-readable instructions that, when executed by at least one computer, cause the at least one computer to perform the method of claim 9.

* * * * *